L. G. EVANS.

Plow.

No. 13,082.

Patented June 19, 1855.

Witnesses.

Inventor.

L. G. Evans

UNITED STATES PATENT OFFICE.

L. G. EVANS, OF SPRING HILL, ALABAMA.

IMPROVEMENT IN PLOWS.

Specification forming part of Letters Patent No. 13,082, dated June 19, 1855.

*To all whom it may concern:*

Be it known that I, L. G. EVANS, of Spring Hill, in the county of Marengo and State of Alabama, have invented a new and useful Improvement in Plows, of which the following is a specification.

The nature of my improvement consists in rendering both the mold-board and landside adjustable at pleasure by means of convenient adjusting-screws; also, to elevate or lower the beam by slide or wedge.

To enable others skilled in the art to make and use my invention, I will proceed to describe its construction and operation, reference being had to the annexed drawings, forming a part of this specification, in which—

Figure 4:
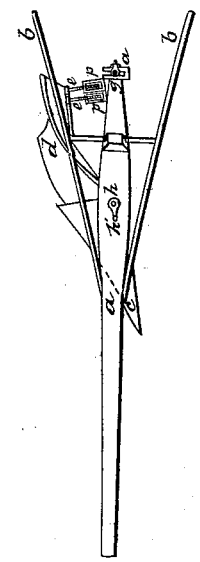
Figure 2:
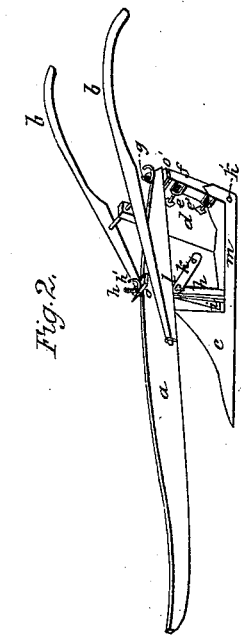
Figure 3:
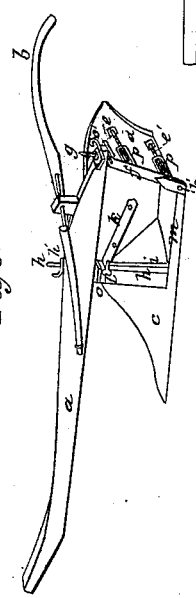
Figure 1:
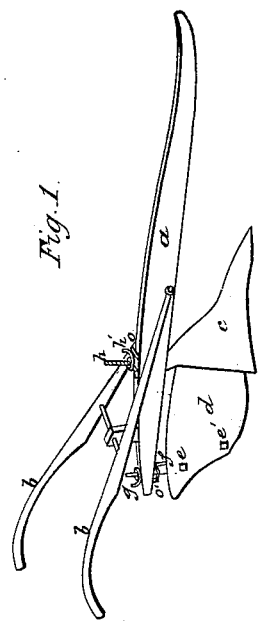

Figures 1, 2, and 3, are different perspective views. Fig. 4 is a top view.

Similar letters refer to like parts.

$a$ is the beam; $b\ b$, handles; $c$, colter; $d$, mold-board; $e\ e'$, adjusting-screws; $f$, upper part of landside; $g$, adjusting-screw; $h'$, nut; $h$, standard; $i$, spring; $k'$, nut and screw; $k\ k$, strap; $l$, set-screw; $o\ o'$, adjusting-wedges; $p\ p$, pivot-nuts; $m$, landside.

The colter $c$ and lower part of the landside $m$ are cast in one piece, as shown, and are fastened to the beam $a$ by means of the standard $h$. The upper part of the colter $c$ is flattened a little and drilled in order to admit the standard. The lower part of the landside $m$ has a staple in order to admit the standard $h$.

The lower portion of the standard $h$ is furnished with a spring, $i$, so that in putting the plow together, when the standard has been drawn through the staple on the landside far enough, the spring $i$ flies out and rests upon the upper edge of $m$ and acts as a support, as shown in Figs. 2 and 3.

The standard $h$, and with it the colter $c$ and landside $m$, is fastened to the beam $a$ by means of the nut $h'$.

The after part of the landside $f$ is made of a separate piece of metal. It is attached to $m$ by means of a nut and screw at $k'$. This method of fastening the parts is of great utility, as it is so simple and at the same time so strong that a new landside can be attached with the utmost expedition whenever desirable.

The upper end of $f$ is bent to a right angle and slotted, and is secured to the beam $a$ by means of the adjusting-screw $g$. The object of the slot in the upper part of the landside $f$ is to permit it, together with the lower part, $m$, and the colter $c$, to be adjusted as desired. By loosening the nuts $h'\ g$ the position of all the parts below the beam may be altered and adjusted, either to make the plow run shallow or deep, or to give it more or less land, as desired. This is a very important and desirable arrangement.

Fig. 4 shows the position of the plow when arranged to cut deep into the land.

The mold-board $d$ is made adjustable by means of the adjusting-screws $e\ e'$, having pivot-nuts $p\ p'$. These nuts are attached to the upper part of the landside $f$, while the adjusting-screws $e\ e'$ are attached to the mold-board $d$. The other end of the mold-board is secured to the standard $h$ by means of the set-screw $l$, which passes through a hole in the upper end of the mold-board. In this manner the mold-board is secured to the standard, and is wholly independent of the colter $c$. This mode of fastening the mold-board also permits it to swing at its juncture with the standard, so that when the plowman wishes to alter the width of the furrow or diminish the draft of the plow he has merely to turn the adjusting-nuts $p\ p$, and the mold-board will be accordingly thrown in or out. The forward edge of the mold-board $d$ underlaps the after edge of the colter $c$, so that a smooth surface is always presented to the earth through which the plow passes.

I am aware that plows have been before made having their mold-boards adjustable by means of one adjusting-screw at the after part of the mold-board; but the forward end of the mold-board of such plows is attached by means of screws to the colter, and can therefore have but one movement.

By making my mold-board independent of the colter and attaching its upper forward end to the standard in the manner described, and by having two adjusting-screws, I am enabled to throw the lower side of the mold-board out or in, as desired, and also to regulate the position of the upper side.

The plows having adjustable mold-boards attached to the colter and adjusted by means of one adjusting-screw cannot be regarded as similar to my improvement. In those plows the bolts which fasten the forward end of the mold-board to the colter must be loosened before the mold-board is adjusted, after which they must be again screwed up.

By attaching the mold-board to the standard according to my improvement, all that is necessary in adjusting the mold-board is to turn the adjusting-screws $e\ e'$.

What I claim as my invention, and desire to secure by Letters Patent, is—

Connecting and arranging the mold-board $d$, landside $m$, and colter $c$ in such a manner that they are together capable of a vertical and lateral adjustment in addition to the particular adjustment of the the mold-board, as described.

L. G. EVANS.

Witnesses:
S. W. BARNEY,
WM. J. ALSTON.